United States Patent [19]

Nishitani et al.

[11] Patent Number: 5,729,384

[45] Date of Patent: Mar. 17, 1998

[54] COMPACT TELESCOPE

[75] Inventors: Kiyoshi Nishitani, Sakai; Yasumasa Sugihara, Hashimoto, both of Japan

[73] Assignee: Minolta Co., Ltd., Osaka, Japan

[21] Appl. No.: 704,164

[22] Filed: Aug. 28, 1996

[30] Foreign Application Priority Data

Aug. 29, 1995 [JP] Japan .................... 7-219929

[51] Int. Cl.⁶ .................... G02B 23/00; G02B 23/18
[52] U.S. Cl. .................... 359/412; 359/407; 359/399
[58] Field of Search .................... 359/407–418, 359/399

[56] References Cited

U.S. PATENT DOCUMENTS

| | | | |
|---|---|---|---|
| 3,062,098 | 11/1962 | Dowling et al. | 359/412 |
| 3,076,382 | 2/1963 | Dowling et al. | 359/412 |
| 3,244,072 | 4/1966 | Dowling et al. | 359/412 |
| 4,013,341 | 3/1977 | Riley | 359/408 |
| 4,986,644 | 1/1991 | Yang | 359/411 |

FOREIGN PATENT DOCUMENTS

| | | |
|---|---|---|
| 25-4685 | 7/1950 | Japan . |
| 62-161210 | 10/1987 | Japan . |

OTHER PUBLICATIONS

Catalogue of Minolta's flat binoculars with translation; Mar. 1, 1995.

*Primary Examiner*—Jon W. Henry
*Attorney, Agent, or Firm*—McDermott, Will & Emery

[57] ABSTRACT

A telescope has an objective lens system, an eyepiece optical system, and a third lens system between the objective lens system and the eyepiece optical system. The objective lens system is provided with a circular shape lens whose upper and lower portions are cut off. The eyepiece optical system is also provided with a circular shape lens whose upper and lower portions are cut off. The third lens system is provided with a circular shape lens which is disposed in a position where a light beam formed by the objective lens system has a smaller cross-sectional area.

20 Claims, 15 Drawing Sheets

COMPACT TELESCOPE

BACKGROUND OF THE INVENTION

1. Field of the Invention

The present invention relates to a compact telescope that affords excellent optical performance despite its slimness and portability.

2. Description of the Prior Art

Conventionally, there are two common types of binoculars. In folding-type binoculars, which have a rotation axle disposed between the right and left lens barrels, the lens barrels are rotated within a predetermined range of angles about that axle, that is, the two lens barrels are folded in and out with respect to the rotation axle so that the binoculars can be adjusted to the observer's eye spacing (hereinafter referred to as eye spacing adjustment). In horizontally-sliding-type binoculars, whose right and left lens barrels are accommodated in a box-like body, the two lens barrels are horizontally slid inside that body so that the binoculars can be adjusted to the eye spacing.

Many models of folding-type binoculars are manufactured in compact sizes and commercially available. In these folding-type binoculars, however, as the right and left lens barrels are angularly displaced about the rotation axle for eye spacing adjustment, the field of view through each of the lens barrels rotates in the reverse direction. For this reason, the use of circular lenses is essential in this type of binoculars, and this poses limitations to designing smaller, and in particular slimmer, models.

On the other hand, in the latter, horizontally-sliding-type binoculars, the use of non-circular field of view does not cause the above described problem. Therefore, the applicant of the present invention disclosed, in a previous application Ser. No. 08/600,366, a construction that realizes slimmer binoculars by making the vertical dimension of the optical system accommodated in each of the right and left lens barrels smaller than its horizontal dimension. In this case, the optical system needs to be composed exclusively of so-called oval lenses, which are circular lenses with their upper and lower portions cut off along lines.

However, such lenses, which have their upper and lower portions cut off along lines, not only cost more than ordinary circular lenses, but also tend to be mounted off-center, necessitating special techniques in the manufacture of commercial models.

SUMMARY OF THE INVENTION

An object of the present invention is to provide a construction of a telescope that allows further downsizing.

Another object of the present invention is to provide a construction of a telescope that affords excellent optical performance despite downsizing.

Still another object of the present invention is to provide a telescope that can be manufactured at low costs despite downsizing.

To achieve the above objects, according to one aspect of the present invention, a telescope comprises an objective lens disposed closest to an object and formed in a circular shape with its upper and lower portions cut off; an eyepiece optical system including a lens formed in a circular shape with its upper and lower portions cut off; and a third lens disposed between said objective lens and said eyepiece optical system and formed in a circular shape.

According to another aspect of the present invention, a telescope comprises an objective lens disposed closest to an object and formed in a circular shape with its upper and lower portions cut off; an eyepiece optical system including a lens formed in a circular shape with its upper and lower portions cut off; and a third lens disposed between said objective lens and said eyepiece optical system and formed in a circular shape with either of its upper and lower portions cut off.

According to still another aspect of the present invention, a telescope comprises first, second, and third lenses arranged in this order from an object side, wherein the first lens is formed in a circular shape with its upper and lower portions cut off, wherein the second lens is formed in a circular shape, and wherein the third lens is formed in a circular shape with its upper and lower portions cut off.

According to a further aspect of the present invention, a telescope comprises first, second, end third lenses arranged in this order from an object side, wherein the first lens is formed in a circular shape with its upper and lower portions cut off, wherein the second lens is formed in a circular shape with either of its upper and lower portions cut off, and wherein the third lens is formed in a circular shape with its upper and lower portions cut off.

As described above, according to the present invention, the use of a circular lens, compared to an oval lens, leads to higher yields in the lens grinding processes, thereby reducing lens manufacturing costs. Moreover, the use of a circular lens prevents off-center mounting, thereby assuring excellent performance of the optical system. Further, since the circular lens is placed in a position where a light beam has a smaller cross-sectional area, it can be made to have a smaller diameter accordingly as the telescope is made slimmer.

Moreover, according to the present invention, the holding frame that holds the circular lens never extends over the upper and lower edges of the circular lens. This allows a lens holding member to have a smaller vertical dimension, contributing to making the telescope slimmer.

BRIEF DESCRIPTION OF THE DRAWINGS

This and other objects and features of this invention will become clear from the following description, taken in conjunction with the preferred embodiments with reference to the accompanied drawings in which:

FIG. 1A shows a state where eye spacing is adjusted to the minimum, FIG. 1B shows a state where eye spacing is adjusted to be wider, and FIG. 1C shows the state of FIG. 1B as seen from the eyepiece side;

FIG. 13A shows a state where the eye spacing is set to minimum, FIG. 13B shows a state where the eye spacing is set to be wider, FIG. 13C shows a state of FIG. 13B as seen from the eyepiece side, and FIG. 13D is a detail view of scale markings;

FIG. 15A is a side view, and FIG. 15B is a diagram showing the positional relationship between the right and left lens barrels;

FIG. 19A is a cross-section, and FIG. 19B is a exploded perspective view of the principal portion; FIG. 20A is a perspective view of the principal portion showing a well-known construction, FIG. 20B is a cross-section of the principal portion, FIG. 20C is a cross-section of the principal portion showing a problem occurring when the well-known construction is applied with a curved cover, FIG. 20D is a cross-section of the principal portion showing a construction adapted to a curved cover, and FIG. 20E is a perspective view of the principal portion of the construction adapted to a curved cover.

DESCRIPTION OF THE PREFERRED EMBODIMENTS

Figure 1A:
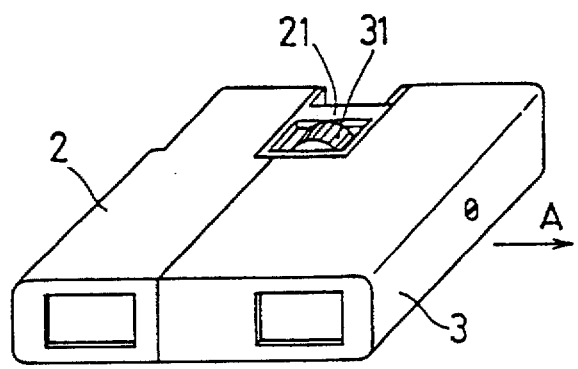
FIGS. 1A, 1B, and 1C are external views of the binoculars of an embodiment of the present invention;.
Figure 1B:
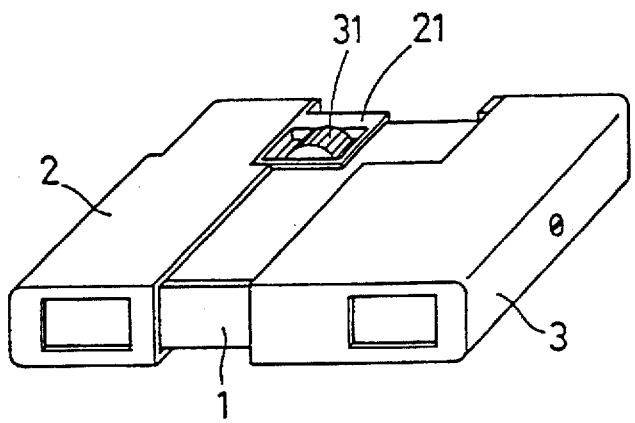
Figure 1C:
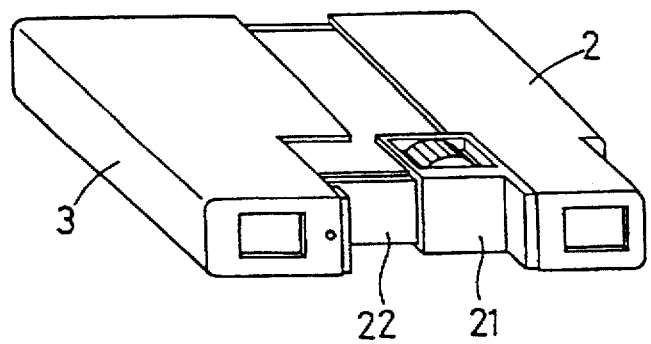
Figure 2:
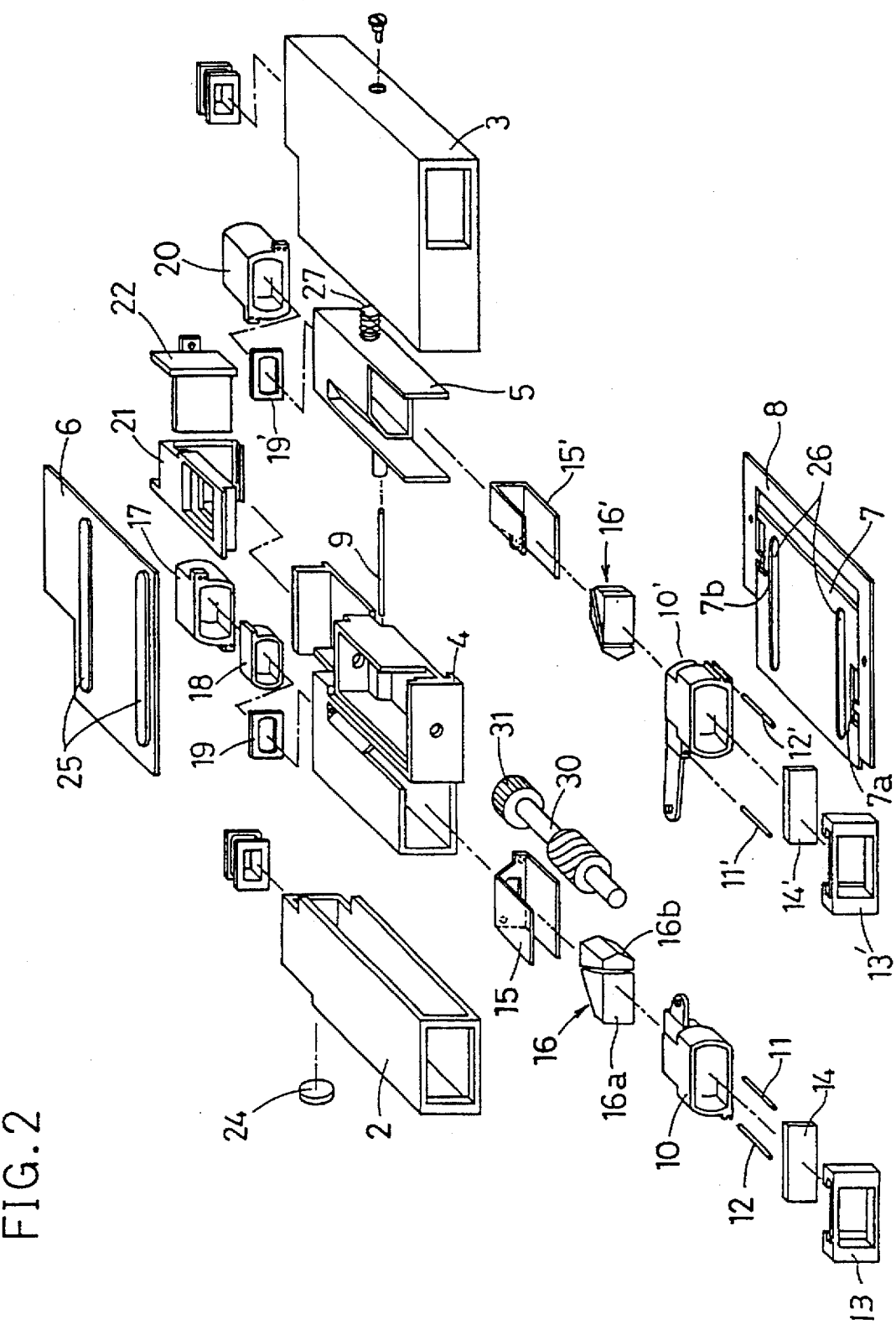
FIG. 2 is an exploded perspective view showing components constituting the binoculars shown in FIGS. 1A to 1C.
Figure 3:
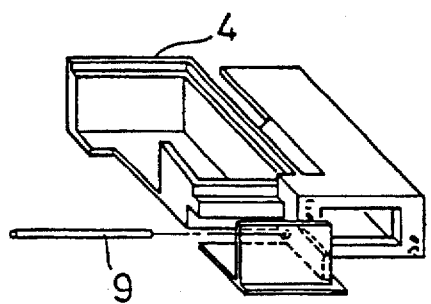
FIG. 3 is a perspective rear view showing the fixed body and the guide axle, which constitute a portion of the internal construction of the binoculars as shown in FIG. 2.
Figure 4:
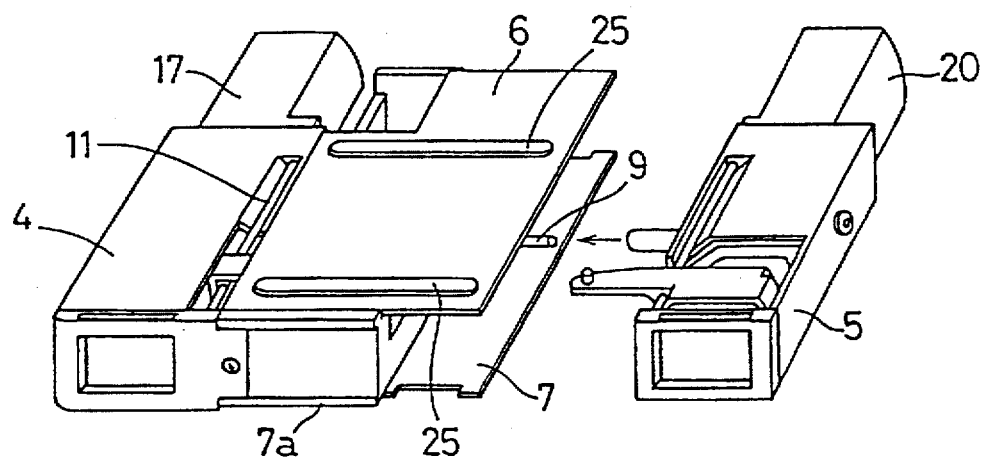
FIG. 4 is a view showing the binoculars with the right and left covers removed from the assembled state shown in FIGS. 1A, to 1C.
Figure 5:
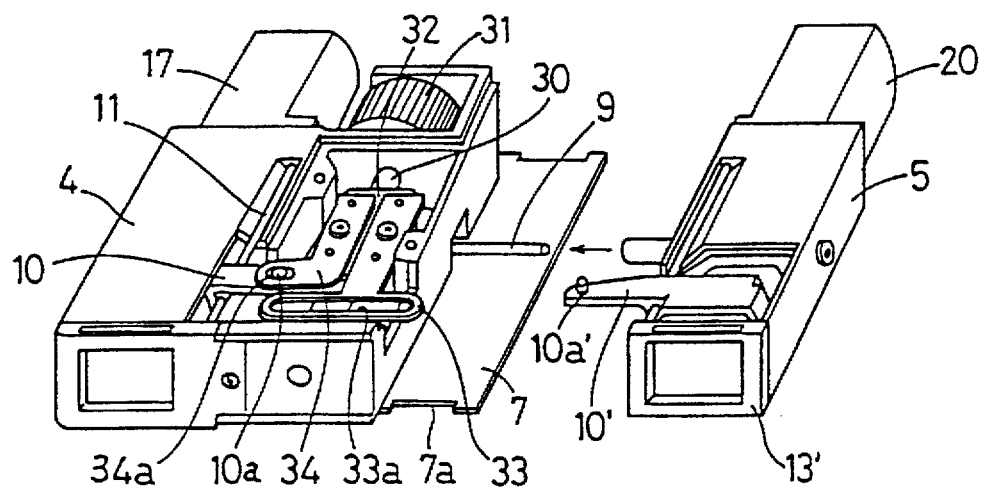
FIG. 5 is a view showing the binoculars with the upper support plate further removed from the partially disassembled state shown in FIG. 4, thereby showing the internal focus adjustment mechanism.

Hereinafter, an embodiment of binoculars according to the present invention will be described below with reference to the drawings. FIGS. 1A, 1B, and 1C are external views of the binoculars of this embodiment. FIG. 1A shows a state where eye spacing is adjusted to the minimum, FIG. 1B shows a state where a left cover 3 has been extended in the direction marked with the arrow A in FIG. 1A in order to obtain a wider eye spacing, and FIG. 1C shows the state of FIG. 1B as seen from the eyepiece side. FIG. 2 is an exploded view showing components constituting the binoculars. FIG. 3 is a rear view showing a fixed body 4 and a guide axle 9. FIG. 4 is a view showing the binoculars with right and left covers 2 and 3 removed from the assembled state shown in FIGS. 1A to 1C. FIG. 5 is a view showing the binoculars with an upper support plate 6 further removed from the partially disassembled state shown in FIG. 4, thereby showing the internal focus adjustment mechanism. Note that, since the binoculars have many common components between the right and left lens barrels, the left-lens-barrel components that have their right-lens-barrel counterparts are designated with the same numbers marked with ' (single quote).

First, the internal construction of the binoculars will be described below. The fixed body 4 shown in the exploded view, FIG. 2, houses a right objective lens frame 10, a prism unit composed of a prism holder 15 and a prism 16, an optical system that includes among other things an eyepiece unit composed of an eyepiece frame 17 and an eyepiece moving frame 18, and a focus adjustment mechanism that comprises a focus adjustment axle 30, an adjustment knob 31, nut 32, a right adjustment plate 34, a left adjustment plate 33, and other components as are shown in the focus adjustment mechanism view, FIG. 5. The above-mentioned right cover 2 is fixed to the fixed body 4.

Arranged opposite to the right optical system, that is, on the other side of the focus adjustment mechanism, is a left movable lens barrel, which comprises a movable body 5, a left objective lens frame 10', prism units 15' and 16', an eyepiece unit 20, and other components. The left movable lens barrel is slidably engaged with a guide axle 9, which is fixed to the fixed body 4. Further, the left cover 3 is attached to the movable body 5.

Figure 6:
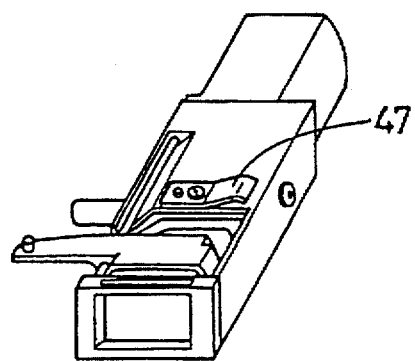
FIG. 6 is a perspective view of the principal portion showing the position of the spring for pressing the movable body shown in FIGS. 4 and 5.

As shown in FIG. 4, on the upper and lower surfaces of the fixed body 4 are fixed upper and lower support plates 6 and 7, which extend toward the movable body 5 so that the left movable body 5 is held from above and below by the support plates 6 and 7. Moreover, as shown in FIG. 6, the left movable body 5 is provided with a spring 47, which presses the movable body 5 down onto the lower support plate 7. This spring 47 and the earlier-mentioned guide axle 9 constitute an eye spacing adjustment mechanism. Incidentally, it is apparently possible to fix the spring 47 on the upper support plate 6. It is however desirable to fix the spring 47 on the left movable body 5, because then the contact position of the spring 47 does not vary as eye spacing is adjusted.

Note that, as opposed to one type of conventional binoculars that have two guide bars, one close to the eyepieces and the other close to the objective lenses, the present invention, which aims in particular to realize slim binoculars, arranges the eyepiece-side guide axle 9 close to field-of-view masks 19 and 19', where the light beams have their narrowest cross-sectional areas; on the other hand, an object-lens-side guide, whose primary role is to stop rotation, is achieved by sliding the movable body 5 along the lower support plate 7. This construction offers more flexibility in designing the optical system.

The focus adjustment mechanism adjusts focus by moving right and left objective lens units along the optical axis; the right and left objective lens units are composed of the objective lenses in the right fixed lens barrel and left movable lens barrel, and the objective lens frames 10 and 10' for holding those lenses. The focus adjustment mechanism is constructed as follows. As shown in FIG. 5, a pin 10a is formed at the tip of the arm of the right objective lens frame 10. The pin 10a is slidably engaged with a slot 34a on the right adjustment plate 34. Similarly, a pin 10a' is formed at the tip of the arm of the left objective lens frame 10', and it is slidably engaged with a slot 33a on the left adjustment plate 33.

When the adjustment knob 31 is rotated, the focus adjustment axle 30 that is integral with the knob 31 also rotates, thereby moving the nut 32 linearly along the optical axis. Fixed to the nut 32 are the right and left adjustment plates 33 and 34, with which the pins 10a and 10a' of the objective lens frames 10 and 10' are engaged. Accordingly, when the adjustment knob 31 is rotated, the right and left objective lens frames 10 and 10' move along the optical axis. Thus, focus adjustment is accomplished.

Figure 7:
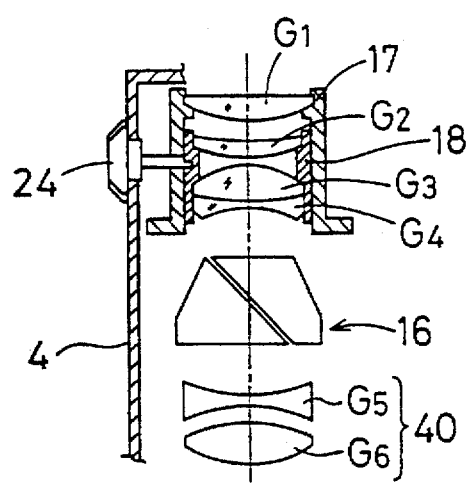
FIG. 7 is a cross-sectional view of the principal portion showing the dioptric power adjustment mechanism in the internal construction of the binoculars as shown in FIG. 2.

FIG. 7 shows a dioptric power adjustment mechanism. Dioptric power adjustment is performed by rotating a dioptric power adjustment knob 24, which is located on the side surface of the right cover 2 and supported by an axle to be perpendicular to the optical axis. More specifically, the eyepiece frame 17 is attached to the fixed body with screws, and, inside the eyepiece frame 17, the eyepiece moving frame 18 that integrally holds lenses $G_2$, $G_3$, and $G_4$ is fitted to be movable along the optical axis.

When the dioptric power adjustment knob 24 is rotated, the eyepiece moving frame 18 moves linearly; this is achieved with the help of a rotational-to-linear movement conversion mechanism (not shown in the figure) such as an eccentric axle. The outermost lens $G_1$ is formed as a plano-convex lens with its outer surface flat. This lens $G_1$ is fixed to the eyepiece frame 17, and serves to protect the group of inner lenses $G_2$, $G_3$, and $G_4$. Reference numeral 40 represents the object lens, which is composed of lenses $G_5$ and $G_6$. Moreover, as shown in FIG. 2, protective glass plates 14 and 14' held in glass holders 13 and 13' are provided on the objective lens side for protection against, for example, dust.

To make the binoculars slim, and at the same time to secure a sufficiently large field of view, the optical system, which has lenses $G_1$ to $G_6$, needs to be so designed that its vertical dimension is shorter than its horizontal dimension. For this reason, the above-mentioned prior art uses for the lenses $G_1$ to $G_6$ only oval lenses, which have shorter dimensions vertically than horizontally. However, since oval lenses are more expensive to manufacture and pose other problems, it is desirable to use as many circular lenses as possible. Hereinafter, a description will be given as to a construction of this embodiment, where circular lenses are used without sacrificing the slimness of the binoculars.

Figure 8:
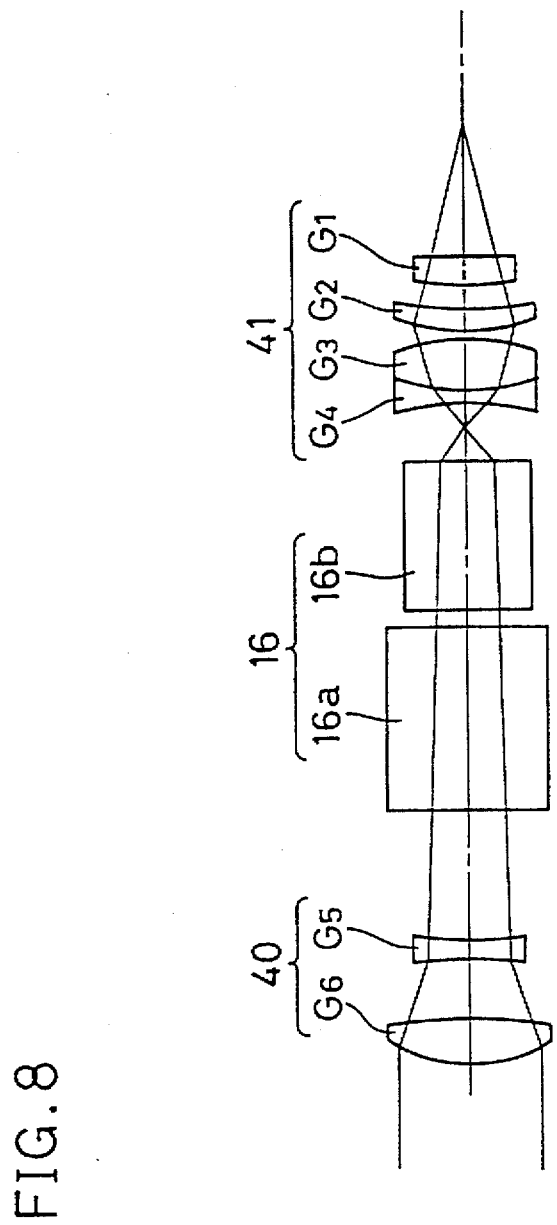
FIG. 8 is a diagram showing the optical system with the prism portion expanded in the internal construction of the binoculars as shown in FIG. 2.

FIG. 8 shows the construction of the optical system of this type of binoculars, with its prism portion shown exploded. In this figure, reference numeral 40 represents an objective lens composed of lenses $G_5$ and $G_6$ for making light from an object form an image in the focus position. Reference numeral 16 is an erecting prism composed of a pair of prisms 16a and 16b for erecting an image inverted by the objective lens 40. Reference numeral 41 represents an eyepiece composed of lenses $G_1$, $G_2$, $G_3$, and $G_4$ for enlarging an image formed by the objective lens 40.

Figure 9:
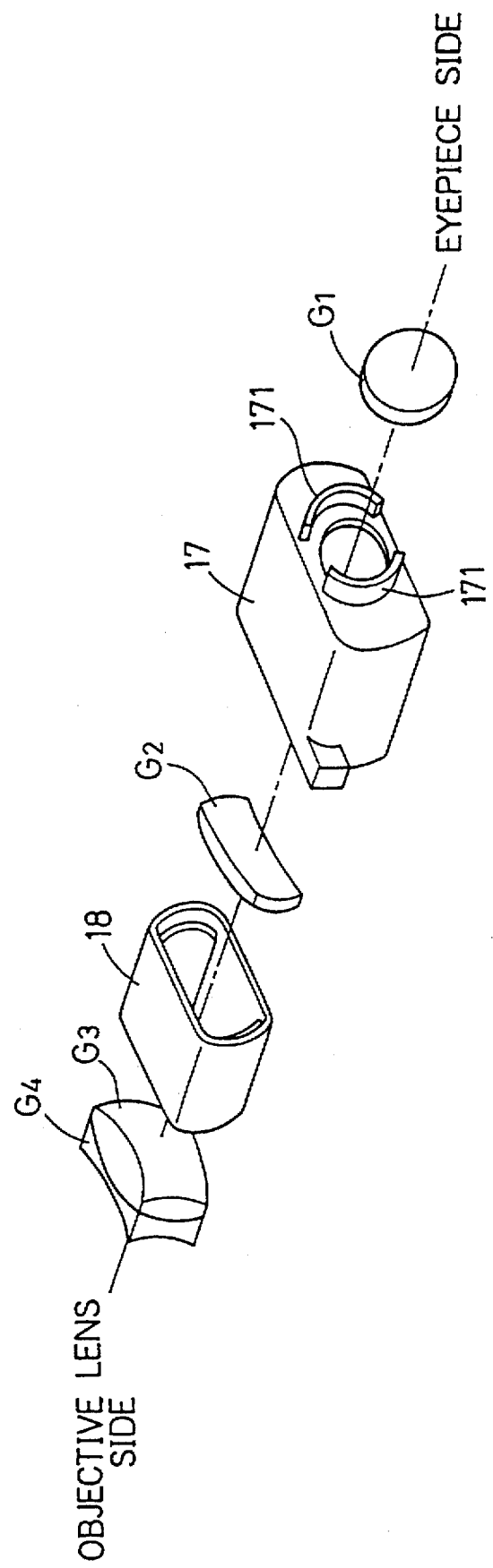
FIG. 9 is an exploded perspective view showing the eyepiece and the lens frame of the right fixed lens barrel in the internal construction of the binoculars as shown in FIG. 2.

FIG. 9 is an exploded perspective view showing the eyepiece unit accommodated in the right fixed body 4 and composed of the eyepiece frame 17, the eyepiece moving frame 18, and the eyepiece $G_1$ to $G_4$. Here, since the lenses $G_2$, $G_3$, and $G_4$ need to be fitted into the eyepiece moving frame 18 constituting the dioptric power adjustment mechanism, their size, the vertical dimension in particular, is restricted when the binoculars are made slimmer. In addition, since the lenses $G_2$, $G_3$, and $G_4$ are placed in a position where the light beam is diverging, they need to have smaller dimensions vertically than horizontally. An example of such a lens is an oval lens, which is a circular lens with its upper and lower portions cut off.

In contrast, the lens $G_1$ can be fitted onto the side surface of the eyepiece frame 17 by means of protrusions 171, which are formed integrally on the eyepiece frame 17. Moreover, as seen from FIG. 8, since the lens $G_1$ is placed in a position where the light beam has a smaller cross-sectional area, a circular lens of a small diameter is used as the lens $G_1$ in this embodiment. The protrusions 171 are formed as a pair of arch-shaped members to hold the right and left side edges of the lens $G_1$, so that the protrusions 171 do not extend over the upper and lower edges of the circular lens $G_1$. The protrusions 171 is therefore effective in reducing the vertical dimension of the eyepiece unit, and ultimately in reducing the thickness of the binoculars.

Note that, since the lens $G_1$ is placed in the outermost position in the eyepiece lens group, it needs to be protected against scratches by making it from glass. Moreover, although it is not shown in the figure, another circular lens made from glass is used as the outermost lens belonging Go the eyepiece lens group accommodated in the eyepiece unit 20 inside the left movable lens barrel.

Figure 10:
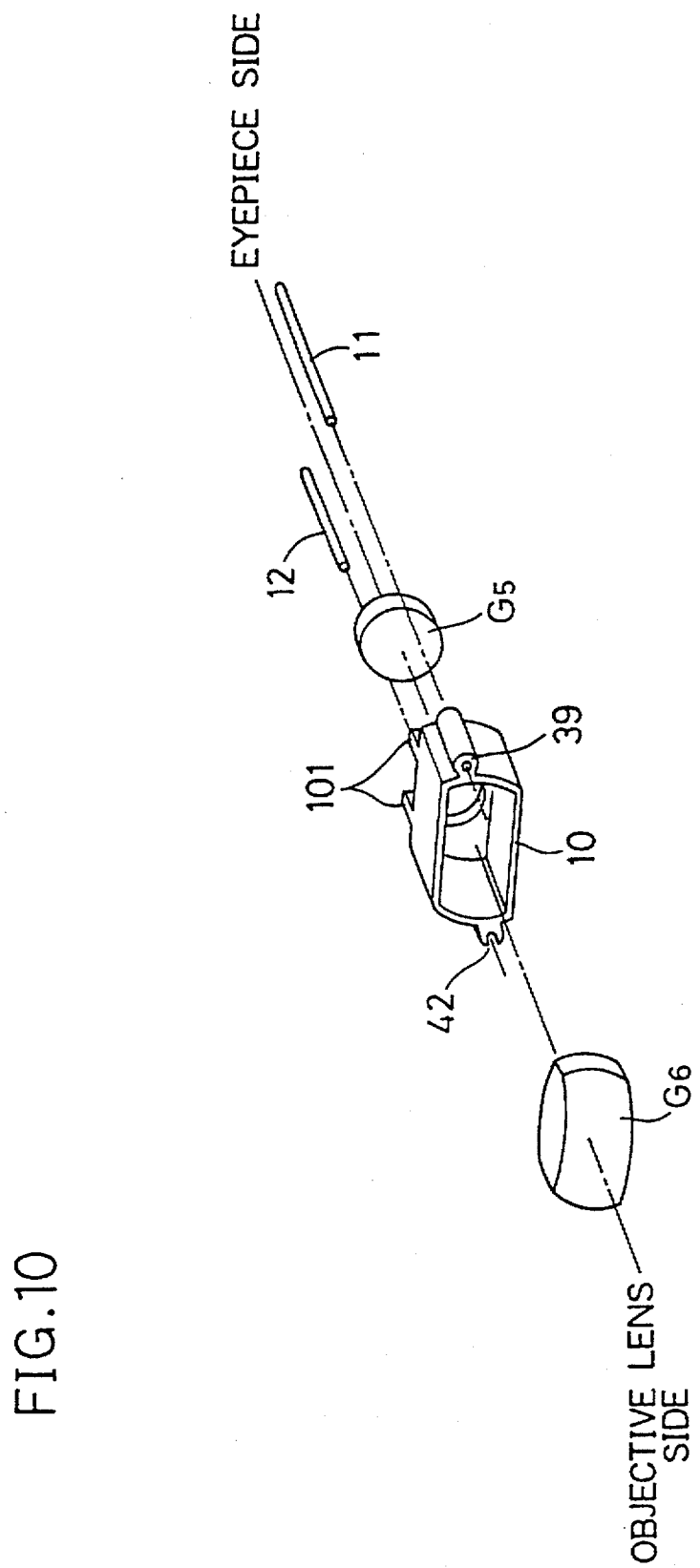
FIG. 10 is an exploded perspective view showing the objective lens and the lens frame of the right fixed lens barrel in the internal construction of the binoculars as shown in FIG. 2.

FIG. 10 is an exploded perspective view showing the objective lenses $G_5$ and $G_6$ and the right objective lens frame 10 for holding those lenses, all of which are accommodated in the right fixed body 4. Here, as seen from FIG. 8, since the light beam has a smaller cross-sectional area in the position where the lens $G_5$ is located, a circular lens of a small diameter is used as the lens $G_5$, just as for the above-mentioned lens $G_1$ of the eyepiece. Moreover, protrusions 101 for holding the lens $G_5$ that are formed integrally with the right objective lens frame 10 are, similarly to the above-mentioned protrusions 171, formed as a pair of arch-shaped members to hold the right and left side edges of the lens $G_1$. Further, although not shown in the figure, the objective lenses and the protrusions for holding them that are accommodated in the left movable lens barrel are constructed in the same way.

Figure 11:
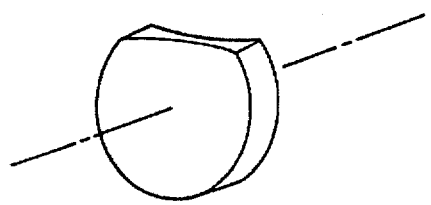
FIG. 11 shows a circular lens with either of its upper or lower portions cut off that may be used instead of the circular lens shown in FIGS. 9 and 10.

As described above, in attempting to make the binoculars slimmer, the use of circular lenses in positions where the light beam has a smaller cross-sectional area is effective both in reducing the thickness of the binoculars and in reducing lens manufacturing costs. In addition, since circular lenses are less prone to be mounted off-center, they help maintain excellent optical performance. Moreover, instead of circular lenses, lenses with either of their upper or lower portions cut off, as shown in FIG. 11, may be used; the use of lenses of this type is advantageous in terms of costs and optical performance, at least compared to oval lenses.

The construction of the whole binoculars will be further described below. As described later in more detail, on the left cover 3 side, the outer cover is not completely fixed to the internal optical construction, but is floated around it to form a floating construction; this is done to stabilize the optical axis. For this reason, the components operated from the outside such as the dioptric power adjustment mechanism are preferably arranged on the fixed body side.

The upper support plate 6 is provided with rails 25, which slightly project upward; the lower support plate 7 is provided with rails 26, which sightly project downward. These rails 25 and 26 serve to guide the left cover 3 vertically when it is slid.

The lower support plate 7 is provided with recesses 7a and 7b on its front and rear edges. With these recesses 7a and 7b, the claw-like portions of a stopper lever 8 engages, forming a stopper for limiting the outward extension of the left cover 3. Moreover, the edge surfaces of the lower support plate 7 and the edge surfaces of the stopper lever 8 are in intimate contact without play with each other in order to guide the lateral movement of the left cover 3.

Figure 12:
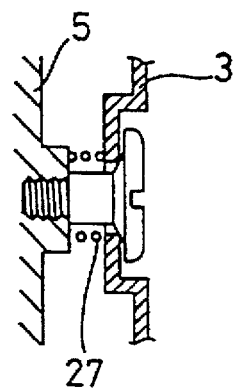
FIG. 12 is a detail view of the principal portion showing the joint portion between the left cover and the movable body in the internal construction of the binoculars as shown in FIG. 2.
Figure 13:
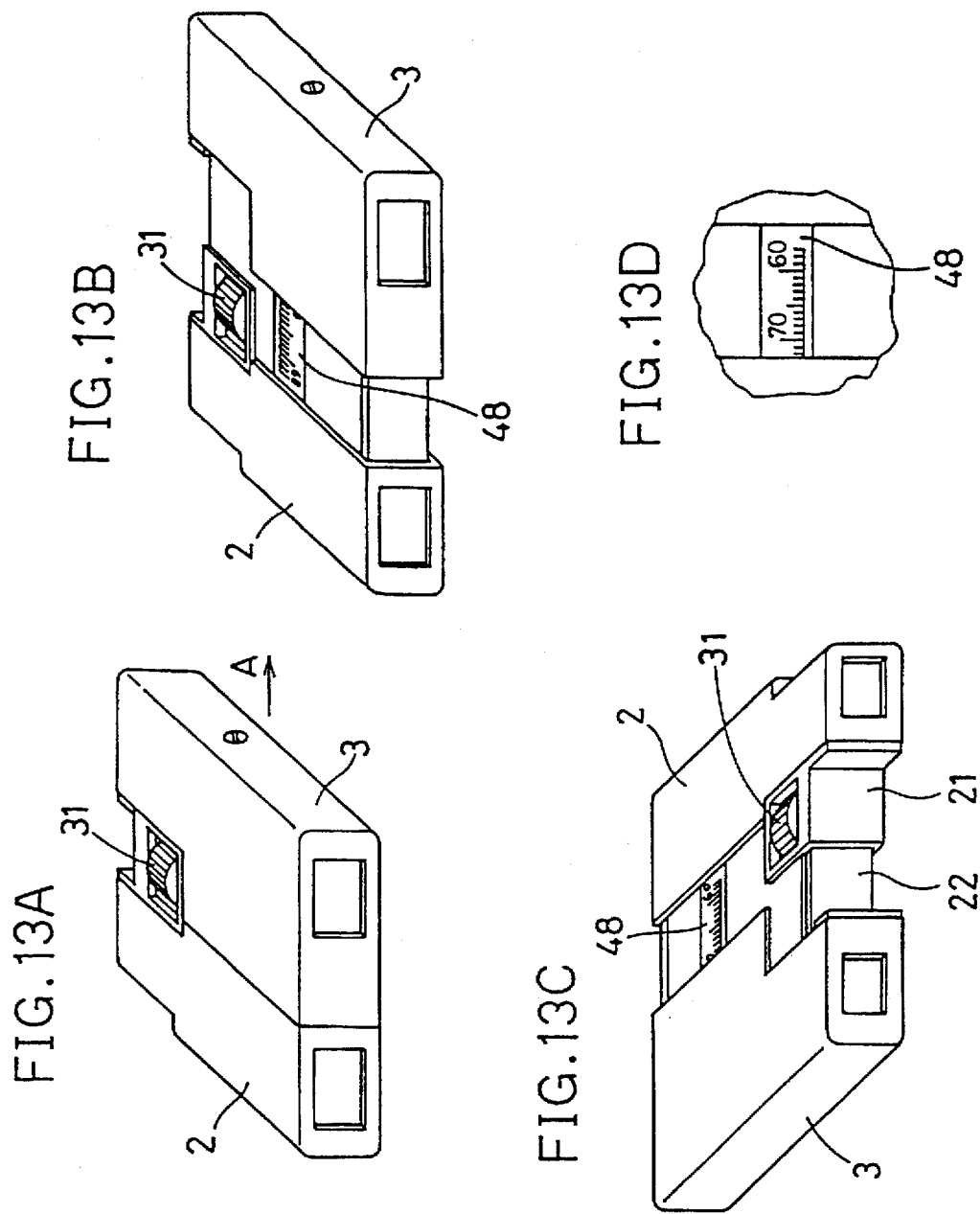
FIGS. 13A, 13B, 13C, and 13D show the eye spacing scale of the binoculars shown in FIGS. 1A to 1C.

The sliding movement of the left cover 3 is guided by the upper and lower support plate 6 and 7, and that of the body 5 including the optical system is guided by the guide axle 9. Here, in order to prevent excessive pressing forces, the left cover 3 and the movable body 5 are joined together, as shown in FIG. 12, with a small clearance to leave play and with a spring 27 to allow free movement within a predetermined range, so that, as a whole, a floating construction is formed.

In addition, in this construction, forces applied from the outside are borne by the left cover 3 and the upper and lower supporting plates 6 and 7, and accordingly it is possible to prevent such forces from affecting the optical axis. Thus, the movable body 5, with the help of the guide axle 9, offers a stable optical axis.

In a construction like this embodiment, where the volume of the whole binoculars changes as they are adjusted between the minimum and maximum eye spacings, it is of great concern how the space appearing between the right and left lens barrels as eye spacing is adjusted should be concealed. In this embodiment, as shown in FIGS. 1A to 1C, since the left cover 3 is larger than the right cover 2, the larger left cover 3 covers the space left behind when it is moved for eye spacing adjustment.

Because of restrictions in designing, and for the sake of ease of use, the eyepiece-side portion of the binoculars is constructed as follows. As shown in FIGS. 1A to 1C, when the eye spacing is adjusted to the minimum, the adjustment knob 31 is approximately at the center of the whole binoculars. When the eye spacing is adjusted to be wider, the adjustment knob 31 keeps its position, with only the left cover 3 slid outward.

In the meantime, the space that is left behind as the left optical system is moved is covered by a barrier 22, which is integrally attached to the left cover 3. The barrier 22 is protected by a knob cover 21 and the upper and lower support plates 6 and 7 against possible damage due to forces applied directly from the outside. The knob cover 21 is so formed that its outer side surface is recessed relative to the edge lines of the right and left covers 2 and 3, in order to prevent the right and left covers 2 and 3 from interfering with the user's nose when the binoculars are held in position. The recessed portion extends as the left cover 3 is extended out.

Moreover, as shown in FIGS. 13A to 13D, as the eye spacing is adjusted to be wider, a eye spacing scale 48 for indicating the eye spacing distance appears. By aligning one edge of the left cover 3 with a specific marking on the scale 48, the binoculars can be set to a desired eye spacing so as to be immediately ready for observation, without a need for actually looking through the binoculars to confirm whether the desired eye spacing is obtained.

Figure 14:
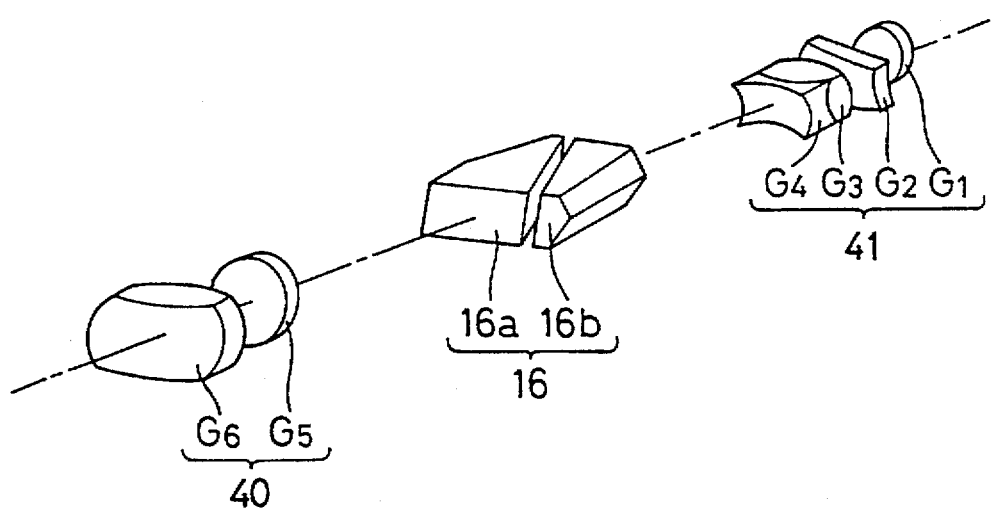
FIG. 14 is a perspective view schematically showing the optical system in the internal construction of the binoculars as shown in FIG. 2.

Next, the constructions for achieving slimmer binoculars will be discussed in detail below. In this connection, the optical system of roof-prism binoculars will be described first. As shown in FIG. 14, the optical system of such binoculars is composed of, for the right lens barrel, three elements: an objective lens 40 for making light from an object form an image in the focus position, an erecting prism 16 for erecting an image inverted by the objective lens 40, and an eyepiece 41 for enlarging an image produced by the objective lens 40. The optical system in the left lens barrel is constructed in the same way; the left-lens-barrel components that have their right-lens-barrel counterparts are designated with the same number marked with ' (single quote).

One of the common choices for realizing smaller, slimmer binoculars is to use objective lenses having smaller effective diameters. This, however, results in binoculars with dark field of view. Therefore, as described earlier, this embodiment employs a so-called oval lens, which actually is a circular lens with its upper and lower portions cut off along lines, as one objective lens $G_6$, and employs a circular lens of a small diameter as another objective lens $G_5$. In accordance with this, a vertically slimmer erecting prism 16 is used, and oval lenses are used as the eyepiece lenses $G_2$, $G_3$, and $G_4$, except the lens $G_1$. Note that, here, a Schmidt prism is used as the erecting prism 6.

Figure 15A:
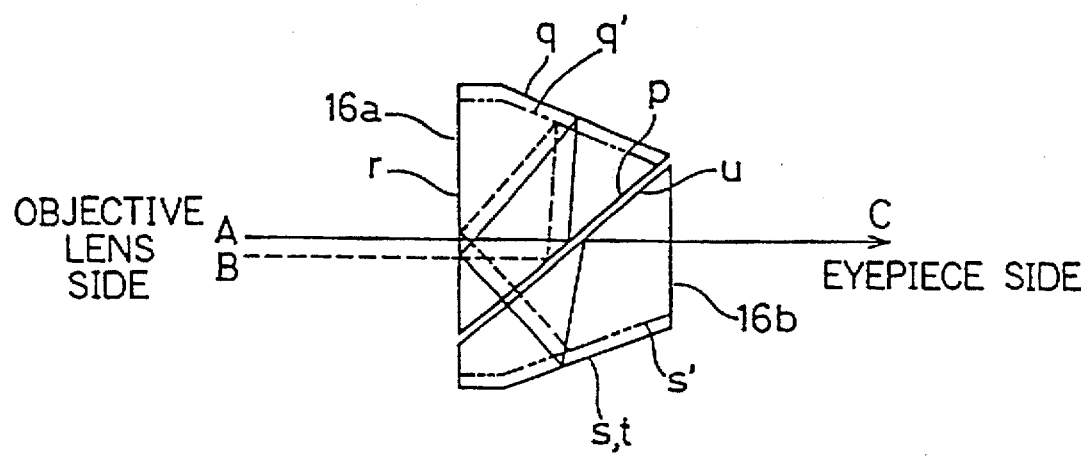
FIGS. 15A and 15B show the construction of the erecting prism in the internal construction of the binoculars as shown in FIG. 2.
Figure 15B:
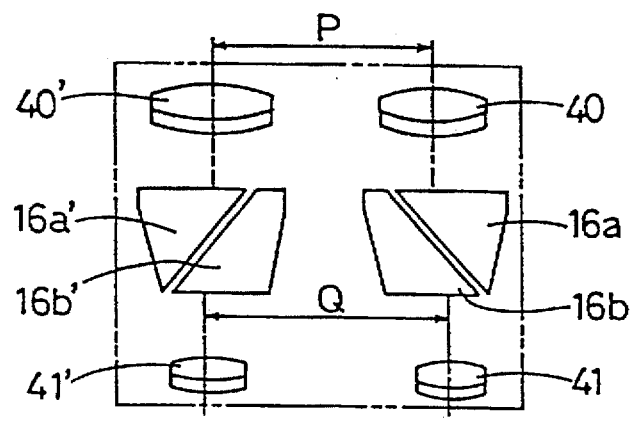

Next, as to the shape of the erecting prism 16 that is crucial to achieving smaller, slimmer binoculars, first, it will be described below, with reference to FIGS. 15A and 15B, how the prism 16 is made smaller horizontally. As shown in FIG. 15A, the erecting prism 16, which is a Schmidt prism here, is composed of an auxiliary prism 16a and a roof prism 16b.

Light incoming from the objective lens 40 is reflected three times in the auxiliary prism 16a, on surface p, surface q, and surface r, and three times in the roof prism 16b, on surfaces s, t and u, or on surfaces t, s and u (the surfaces s and t are a pair of roof surfaces), and is then directed toward the eyepiece 41. Since the lateral width of the erecting prism 16 depends on the distance between the reflecting surfaces q and s (t), the erecting prism 16 can be made smaller by simply bringing these two reflecting surfaces q and s (t) closer together.

It is possible to bring the two reflecting surfaces q and s (t) closer together, that is, to bring both surfaces inward, by displacing the position of incoming light into the erecting prism 16 with respect to the position of outgoing light therefrom. In FIG. 15A, the solid line indicates the optical path in the case where the optical axis A of the incoming light coincides with the optical axis C of the outgoing light; the broken line indicates the optical path in the case where the optical axis B of the incoming light is displaced away from the optical axis C of the outgoing light. By displacing the optical axis of the incoming light from the solid line A to the broken line B, the reflecting surfaces q and s (t) can be moved inward to q' and s' (t'), respectively. This does not affect the position of the optical axis C of the outgoing light. Note that, to make the prism 16 smaller, the optical axis A of the incoming light must be displaced toward the broken line B with respect to the optical axis C of the outgoing light; otherwise, the prism will be larger.

The erecting prism 16, made slimmer as described above, is arranged as shown FIG. 15B, where the distance P between the right and left objective lens frames is smaller than the distance Q between the right and left eyepiece frames (P<Q), so that the distance between the optical axes is greater on the eyepiece side. This arrangement produces extra free spaces between the objective lens frames 10 and 10' and the outer covers, and achieves a shorter sliding stroke between the minimum and maximum eye spacings. In this construction, therefore, it is easy to secure sufficient mechanical strength and to conceal portions that are not to be exposed.

As to the vertical dimension of the erecting prism 16, its effective diameter in the vertical direction can be made smaller by using an oval lens as the objective lens $G_6$ and by using a small circular lens as the objective lens $G_5$, which is placed at a position where the light beam has a smaller cross-sectional area, as described above. This contributes to making the binocular slimmer. Here, the erecting prism 16 is made further smaller by making the roof prism 16b smaller than the auxiliary prism 16a.

More specifically, as shown in FIG. 8 with the prism portion exploded, the objective lens 40 causes a light beam to converge. As a result, compared to the effective width of the auxiliary prism 16a that is the first the light beam enters, the effective width of the roof prism 16b that is the second the light beam enters may be smaller. This allows the prism 16 to be made further smaller. Note that, in making a prism smaller in vertical and horizontal directions, it is essential to consider not only on-the-axis light but also off-the-axis light (not shown in the figure).

In this embodiment, as shown in FIG. 2, the prism holder 15 is arranged in such a way that its fixed portion is placed on the downstream side of the erecting prism 16. Therefore, even though the roof prism 16b is made slimmer, the resulting loss of mechanical strength can be compensated for by, for example, making thicker the arm portions of the prism holder 15.

Further, in order to achieve slimmer binoculars, not only the above-mentioned optical system, but also mechanisms around it need to be made slimmer. In this connection, a description will be given below, with reference to FIG. 10, as to the lens frame 10 that holds the oval lens $G_6$ and the small-diameter circular lens $G_5$. To adjust the focus of the binoculars, the lens frame 10 with the object lens group $G_5$ and $G_6$ fitted on it needs to be moved along the optical axis Here, the objective lens frame 10 is moved by means of guide axle 11 and rotation stopper axle 12. The lens frame 10 is provided with m guide hole 39 and a U-shaped groove 42, through which the axles 11 and 12, respectively, are disposed. The guide axle 11, the rotation stopper axle 12, the guide hole 39, and the U-shaped groove 42 are all disposed at heights between the upper and lower edges of the oval objective lens 40. Thus, by disposing the guide axle 11 and the rotation stopper axle 12 within the range of heights W shown in FIG. 16, the thickness of the whole binoculars can be reduced.

Figure 16:
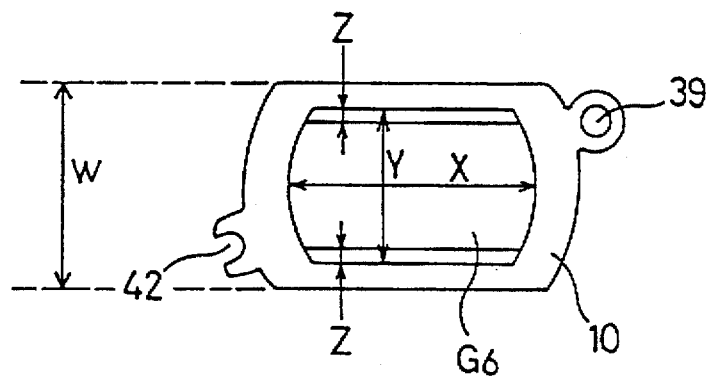
FIG. 16 is a front view showing the assembled state of the oval objective lens and the lens frame in the internal construction of the binoculars as shown in FIG. 2.

The relationship between the oval objective lens $G_6$ and the lens frame 10 is as follows. The oval lens $G_6$ shown in FIG. 16 is relatively easy to finish to satisfactory accuracy in the radial-direction dimension X, but not so in the horizontal-direction dimension Y. For this reason, the position of the objective lens $G_6$ relative to the lens frame 10 needs to be determined by the curved surfaces at both ends of the radial-direction dimension X. That is, the objective lens $G_6$ is made to keep contact with the lens frame 10 along the curved surfaces on its both sides, whereas clearances Z are left between them along the top and bottom edges.

Figure 17:
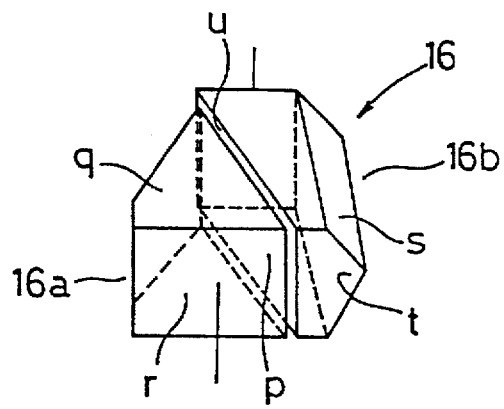
FIG. 17 is a perspective view showing the erecting prism in the internal construction of the binoculars as shown in FIG. 2.

In the Schmidt prism used in this embodiment, to obtain an erect image, light beam is reflected horizontally five times in total, as shown in FIG. 17, on the surfaces p, q, and r of the auxiliary prism 16a, and then on the surfaces s and t, and u of the roof prism 16b. The light beam is reflected also vertically once on the roof surfaces s and t of the roof prism 16b to form an erect image. These roof surfaces s and t are finished accurately to form an angle of 90° between them.

Figure 18:
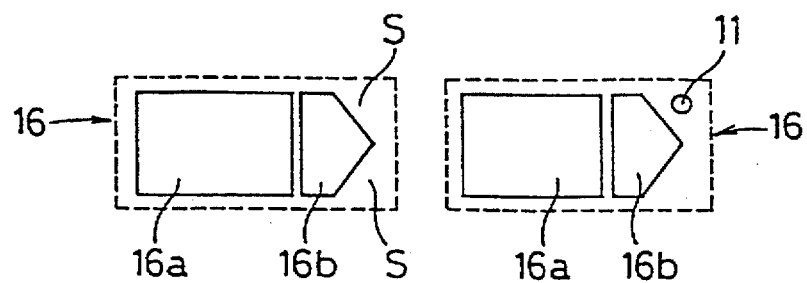
FIG. 18 is a diagram showing the arrangement of the erecting prism shown in FIG. 17.

Since the roof prism is provided with these roof surfaces s and t that form a 90° angle, there remain two free spaces S on its upper and lower sides as shown in FIG. 18. This embodiment makes effective use of these spaces S thus obtained over the roof surfaces of the roof prism 16 by arranging there the above-mentioned guide axle 11 for moving the object lenses. This contributes to making the whole binoculars smaller and slimmer.

Although the spaces S are used for arranging the guide axle 11 in this embodiment, they may be used for other purposes. For example, any component of the binoculars may be arranged in these spaces S.

Figure 19A:
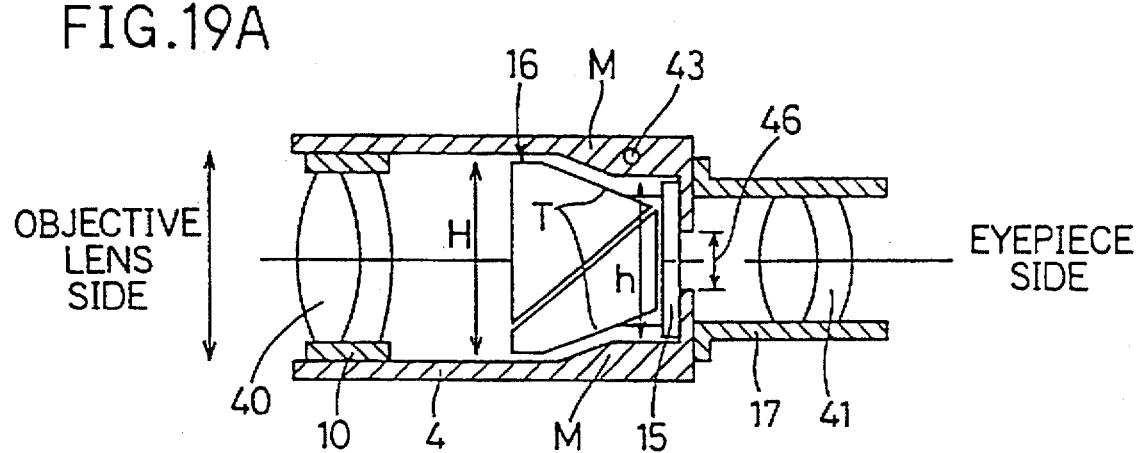
FIGS. 19A and 19B show the right lens barrel in the internal construction of the binoculars as shown in FIG. 2.
Figure 19B:
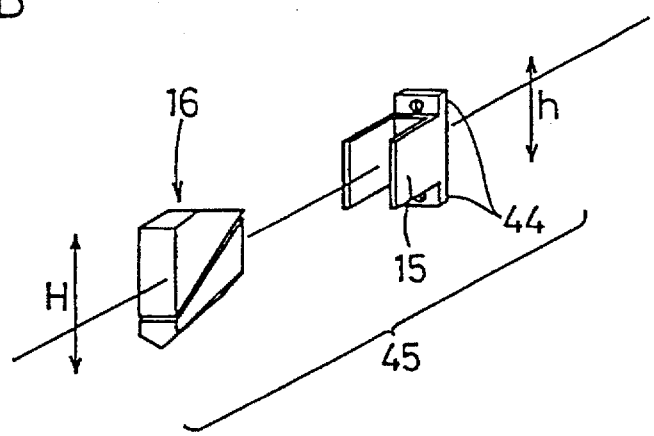

The erecting prism 16 composed of a Schmidt prism is arranged, as shown in FIGS. 19A and 19B, with its wider end facing toward the objective lens and its narrower end facing toward the eyepiece. This arrangement of the erecting prism 16 allows it to be fitted into the fixed body 4 from the objective lens side, contributing to making the whole binoculars smaller.

The above arrangement also affects the flange portion 44 on the prism holder 15 that is provided for fixing the prism to the fixed body 4. More specifically, since the Schmidt prism 16 is composed of an auxiliary prism 16a and a roof prism 16b as described above, it is necessary to provide a prism holder 15 to hold integrally those two prisms 16a and 16b. The prism holder 15 is provided with a flange portion 44, through which it is fixed to the body 4.

To make the whole binoculars compact, this flange portion 44 also needs to be as low-profile as possible when it is provided on the prism holder 15. Now, suppose an integral unit composed of a prism holder 15, an auxiliary prism 16a, and a roof prism 16b as are described above is referred to as a prism block 45, and consider its width on the objective lens side H and width on the eyepiece side h.

Take, for example, the case where the prism block 45 is fitted into the fixed body 4 from the eyepiece side. In this case, the body needs to have, on its eyepiece side, an opening larger than the width H. Then, the prism block 45 is inevitably fitted into the body with its narrower end of the width h placed in the middle of the larger opening on the eyepiece side of the body. This makes the whole binocular larger. In addition, providing an opening wider than the width H on the eyepiece side of the body reduces mechanical strength of the fixed body 4.

To avoid the above problem, in this embodiment, the prism block 45 is fitted into the body from the object lens side. In this case, the body needs to have an opening of only the minimum width h on its eyepiece side. This helps make the binoculars compact. In addition, the size of a hole 46 provided on the eyepiece side of the body can be reduced to a minimum, so that it is just large enough to cover the optically effective range. Moreover, since the fixed body 4 can be reinforced by increasing its wall thickness along the inclined surfaces T of the Schmidt prism 16, it can be made to have sufficient mechanical strength.

This embodiment makes effective use of the extra spaces M obtained along the inclined surfaces T to make thicker the body wall and provide further a hand strap axle 43 there, in order to make the binoculars more compact. Although the spaces M are used for arranging the hand strap axle 43 in this embodiment, any component of the binoculars can be arranged there. Moreover, these spaces M are obtained both in the fixed body 4 and movable body 5, and any of these spaces can be used for such purposes.

Figure 20A:
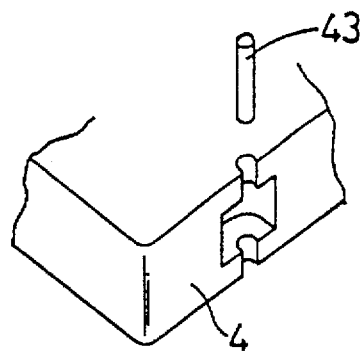
FIGS. 20A, 20B, 20C, 20D, and 20E show the construction of the hand strap portion of the binoculars shown in FIGS. 1A, 1B, and 1C.
Figure 20B:
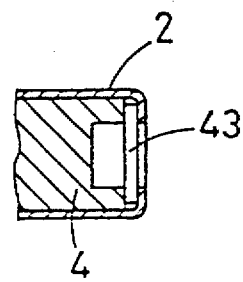

In this embodiment, however, the spaces M in the fixed body 4 is preferably used for arranging components such as the hand strap axle 43 to which external forces are applied, because, there, the external forces affect less the optical axis or other internal mechanisms. FIGS. 20A to 20E show the construction of the hand strap portion. As shown in FIGS. 20A and 20B, the hand strap portion of this embodiment is constructed according to a well-known method. The hand strap axle 43 is placed through the fixed body 4, and is fixed by the right cover 2 to prevent dropping away.

Figure 20C:
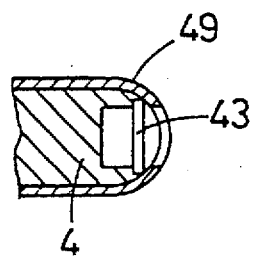
Figure 20D:
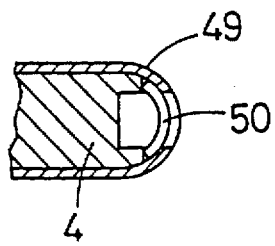
Figure 20E:
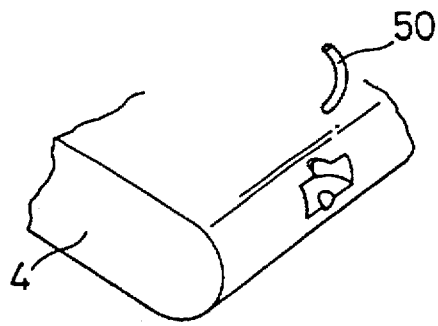

Note that, in the case where a curved cover 49 is used as the outer cover (right cover) as shown in FIG. 20C, the above described construction of the hand strap portion poses problems such as difficulty in attaching the strap (not shown in the figure), because the hand strap axle 43 is located deeply inside. Such a problem is overcome by using a pin 50 which is curved in a similar way to the curve of the cover 49, as shown in FIGS. 20D and 20E.

Note also that, the fixed body 4 needs to have an opening wide enough to accommodate the objective lens frame 10, but, since this width is larger than the width H from the beginning, the binoculars need not be made larger in order that the prism block 45 is fitted from the objective lens side. Further, although the prism block 45 is fitted from the objective lens side in this embodiment, it may also be fitted from a direction other than the direction toward which the prism block fixing surface faces; for example, it may be fitted from a direction perpendicular to the optical axis.

Although only horizontally-sliding-type binoculars that change their external shape by sliding their two lens barrels are described in this embodiment, the present invention can be also applied to fixed-type binoculars that do not have a eye spacing adjustment mechanism.

As described above, according to the present invention, the use of a circular lens, compared to an oval lens, leads to higher yields in the lens grinding processes, thereby reducing lens manufacturing costs. Moreover, the use of a circular lens prevents off-center mounting, thereby assuring excellent performance of the optical system. Further, since the circular lens is placed in a position where a light beam has a smaller cross-sectional area, it can be made to have a smaller diameter accordingly as the telescope is made slimmer.

Moreover, according to the present invention, the holding frame that holds the circular lens never extends over the upper and lower edges of the circular lens. This allows a lens holding member to have a smaller vertical dimension, contributing to making the telescope slimmer.

What is claimed is:

1. A telescope comprising:
   an objective lens disposed closest to an object and formed in a circular shape with its upper and lower portions cut off;
   an eyepiece optical system including a lens formed in a circular shape with its upper and lower portions cut off; and
   a third lens disposed between said objective lens and said eyepiece optical system and formed in a circular shape.

2. A telescope as claimed in claim 1,
   wherein said third lens is disposed in a position where a light beam formed by said objective lens has a smaller cross-sectional area.

3. A telescope as claimed in claim 1,
   wherein said eyepiece optical system further includes a circular lens.

4. A telescope as claimed in claim 1,
   wherein said objective lens, said eye piece optical system, and said third lens are each provided in a pair, constituting binoculars as a whole.

5. A telescope as claimed in claim 4,
   wherein the objective lens, the eyepiece optical system, and the third lens on one side are horizontally slidable with respect to the objective lens, the eyepiece optical system, and the third lens on another side, wherein each of said pair of optical systems and third lenses of said binoculars are positioned parallel to a horizontal plane.

6. A telescope comprising:
   an objective lens disposed closest to an object and formed in a circular shape with its upper and lower portions cut off;
   an eyepiece optical system including a lens formed in a circular shape with its upper and lower portions cut off; and
   a third lens disposed between said objective lens and said eyepiece optical system and formed in a circular shape with one of its upper and lower portions cut off and another of the portions left circular.

7. A telescope as claimed in claim 6,
   wherein said third lens is disposed in a position where a light beam formed by said objective lens has a smaller cross-sectional area.

8. A telescope as claimed in claim 6,
   wherein said eyepiece optic system further includes a circular lens.

9. A telescope as claimed in claim 6,
   wherein said objective lens, said eye piece optical system, and said third lens are each provided in a pair, constituting binoculars as a whole.

10. A telescope as claimed in claim 9,
    wherein the objective lens, the eyepiece optical system, and the third lens on one side are horizontally slidable with respect to the objective lens, the eyepiece optical system, and the third lens on another side, wherein each of said pair of optical systems and third lenses of said binocular are positioned parallel to a horizontal plane.

11. A telescope comprising:
    first, second, and third lenses arranged in this order; and
    an image erecting element provided between said first and third lenses,
    wherein the first lens is formed in a circular shape with its upper and lower portions cut off,
    wherein the second lens is formed in a circular shape, and
    wherein the third lens is formed in a circular shape with its upper and lower portions cut off.

12. A telescope as claimed in claim 11, further comprising:
    a fourth lens disposed in a fourth position from the object side and formed in a circular shape.

13. A telescope as claimed in claim 11,
    wherein said first, second and third lenses are each provided in a pair, constituting binoculars as a whole.

14. A telescope as claimed in claim 13,
    wherein the first, second, and third lenses on one side are horizontally slidable with respect to the first, second, and third lenses on another side, wherein each of said pair of lenses of said binoculars are positioned parallel to a horizontal plane.

15. A telescope comprising:
    first, second, and third lenses arranged in this order; and
    an image erecting element provided between said first and third lenses, wherein the first lens is formed in a circular shape with its upper and lower portions cut off, wherein the second lens is formed in a circular shape with one of its upper and lower portions cut off and another of the portions left circular, and wherein the third lens is formed in a circular shape with its upper and lower portions cut off.

16. A telescope as claimed in claim 15, further comprising:

a fourth lens disposed in a fourth position from the object side and formed in a circular shape.

17. A telescope as claimed in claim 15, wherein said first, second, and third lenses are each provided in a pair, constituting binoculars as a whole.

18. A telescope as claimed in claim 17, wherein the first, second, and third lenses on one side are horizontally slidable with respect to the first, second, and third lenses on another side, wherein each of said pair of lenses of said binoculars are positioned parallel to a horizontal plane.

19. A telescope comprising:

an objective lens disposed closest to an object and formed in a circular shape with its upper and lower portions cut off;

an eyepiece optical system including a lens formed in a circular shape with its upper and lower portions cut off; and a third lens disposed between said objective lens and said eyepiece optical system and formed in a circular shape with either of its upper and lower portions cut off, wherein said eyepiece optical system further includes a circular lens.

20. A telescope comprising:

an objective optical system composed of a plurality of lenses and including both a lens formed in a circular shape and a lens formed in a circular shape with one of its upper and lower portions cut off; and an eyepiece optical system composed of a plurality of lenses and including both a lens formed in a circular shape and a lens formed in a circular shape with one of its upper and lower portions cut off.

* * * * *

UNITED STATES PATENT AND TRADEMARK OFFICE
CERTIFICATE OF CORRECTION

PATENT NO. : 5,729,384
DATED : March 17, 1998
INVENTOR(S) : Kiyoshi NISHITANI et al.

It is certified that error appears in the above-indentified patent and that said Letters Patent is hereby corrected as shown below:

Col. 12,    Line 28, Delete "optie" and insert --optical--

Col. 12,    Line 40, Delete "binocular" and insert --binoculars--

Signed and Sealed this

Twenty-ninth Day of September, 1998

Attest:

BRUCE LEHMAN

*Attesting Officer*    Commissioner of Patents and Trademarks